April 7, 1936.　　　　R. L. LONG　　　　2,036,763
VALVE LOCK
Filed Dec. 12, 1935
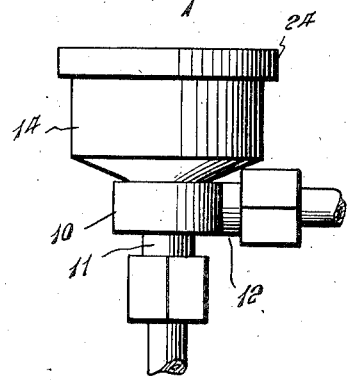
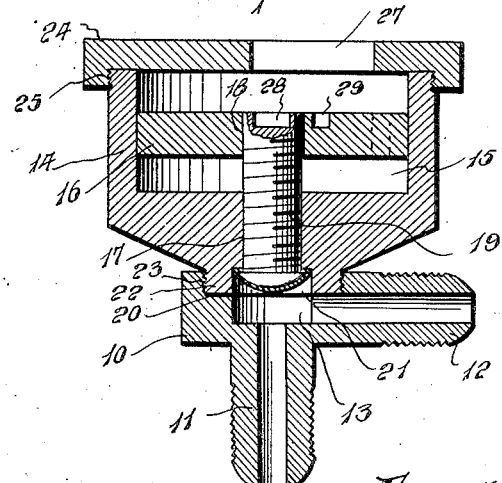
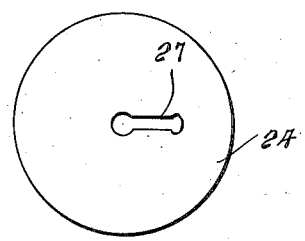
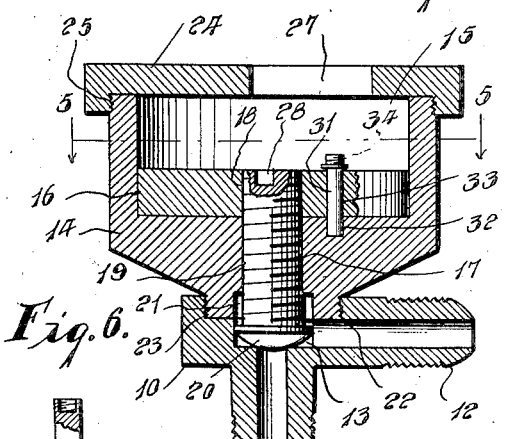
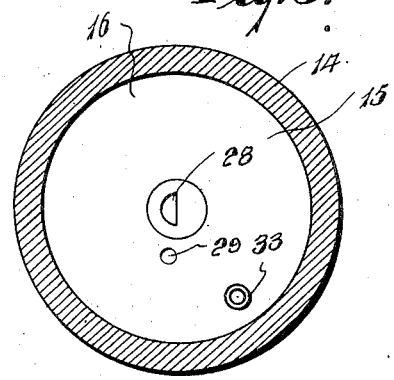
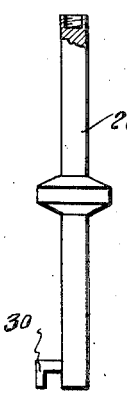
Inventor
Robert L. Long,
By L. F. Randolph, Jr.
Attorney Patented Apr. 7, 1936

2,036,763

UNITED STATES PATENT OFFICE 2,036,763

VALVE LOCK

Robert L. Long, Norwood, Ohio

Application December 12, 1935, Serial No. 54,119

5 Claims. (Cl. 251—6)

This invention relates to a means whereby a fluid may be cut off between the source of supply and point of use, as a safety feature to prevent unauthorized use and more particularly to a means adapted to cut off the supply of gasoline or fuel at any point in the fuel line of an automobile propelling engine.

It is particularly aimed to provide a valve construction adapted for incorporation at any desired location of such a fuel line, which is built to withstand tampering and of a construction which will require an individual key for operating means for each article built or installed, to avoid a possibility of operation of a number of the devices through the use of a master key or the like.

The more specific objects and advantages will become apparent from a consideration of the description following taken in connection with the accompanying drawing illustrating an operative embodiment.

In said drawing:—

Figure 1 is a view of the lock in side elevation;

Figure 2 is a plan view thereof;

Figure 3 is a central vertical sectional view;

Figure 4 is view similar to Figure 3, but showing valve in closed position;

Figure 5 is a cross sectional view taken on the line 5—5 of Figure 4;

Figure 6 is an elevation, partly broken away, of the operating key; and

Figure 7 is a detail side elevation of the valve means per se.

Referring specifically to the drawing, the device comprises, in one example, an L-shaped fitting 10 having nipples at 11 and 12, with a passage 13 passing therethrough, so that one nipple constitutes an inlet, and the other constitutes an outlet. A valve casing 14 has a chamber 15 in which a control head or disc 16 is rotatable and slidable. Screw threaded in the lower wall of the casing 14, as at 17, and into the control head, as at 18, is a valve stem 19. Valve stem 19 has a valve head at 20 normally adapted to remain retracted within a recess 21 communicating with passage 13.

In the assembling of the device, disc 16 is inserted into the chamber 15 while the stem 19 is applied on the lower or outer end of the casing 14, subsequent to which the stem is soldered to the plate 16 and the lower wall of casing 14 at a neck 22 is interfitted into the fitting 10 and soldered thereto, as at 23.

As a further safety feature, a cap or cover 24 is screw threaded and soldered to the casing 14, as at 25.

The valve is operable by a key 26, such as is suggested in Figure 6, and which is applicable through a slot 27 provided in the cover or cap 24. The upper end of the stem 19 and the upper surface of the plate 16 are provided with recesses 28 and 29, engageable respectively by the lower end of the key 26 and a projection 30 on such key, in order that the plate 16 and valve may be screwed to on and off position.

In addition, the plate 16 and lower wall of casing 14 may have recesses or openings 31 and 32, round, square, or otherwise in cross section, so that in the closed position of the valve a pin 33 of a cross section corresponding to that of said recesses 31 and 32 may be disposed therein. Such key has a screw threaded upper end 34 which is engageable by the correspondingly threaded recess 35 in one end of the key 26, and which is applicable through the slot 27 to engage or disengage such key 33.

Particular attention is called to the fact that the inter-engaging projection of the key, stem 19 and plate 16, as at the lower end of the key, at 30, 28 and 29, may be reversed and arranged at varying distances and locations, so that each structure manufactured according to the invention will have a different key, necessitating a different key for the operation thereof and thus guarding against such a construction or series of structures wherein a master key might be employed to operate them. It will also be borne in mind that threads 34 may be of a different number, different pitch, and the like, to minimize the chances of surreptitious operation of the pin 33.

In the use of the device it is obvious that it may be connected at any point desired in the fuel line of the propelling motor of an automobile or the like, or in an equivalent location, wherever used.

Various changes may be resorted to provided they fall within the spirit and scope of the invention.

I claim as my invention:—

1. A device of the class described, comprising a casing having a chamber, a plate slidable and rotatable in the chamber, a valve stem screw threaded to the casing and applicable from the end opposite to the chamber, said stem being secured to the plate, a valve head on said stem at the end opposite to the chamber, larger than the portion of the stem which is threaded to the casing, a fitting having an inlet and an outlet to which the last-mentioned end of the casing is fastened, said valve head controlling the inlet and outlet.

2. A device of the class described, comprising a casing having a chamber, a plate slidable and rotatable in the chamber, a valve stem screw threaded to the casing and applicable from the end opposite to the chamber, said stem being secured to the plate, a valve head on said stem at the end opposite to the chamber, larger than the portion of the stem which is threaded to the casing, a fitting having an inlet and an outlet to which the last-mentioned end of the casing is fastened, said valve head controlling the inlet and outlet, and key-engageable means on said stem and said plate.

3. A device of the class described, comprising a casing having a chamber, a plate slidable and rotatable in the chamber, a valve stem screw threaded to the casing and applicable from the end opposite to the chamber, said stem being secured to the plate, a valve head on said stem at the end opposite to the chamber, a fitting having an inlet and an outlet to which the last-mentioned end of the casing is fastened, said valve head controlling the inlet and outlet, said plate and casing having registerable recesses in the closed condition of the valve, and a locking pin applicable to said recesses.

4. A device of the class described, comprising a casing having a chamber, a plate slidable and rotatable in the chamber, a valve stem screw threaded to the casing and applicable from the end opposite to the chamber, said stem being secured to the plate, a valve head on said stem at the end opposite to the chamber, a fitting having an inlet and an outlet to which the last-mentioned end of the casing is fastened, said valve head controlling the inlet and outlet, said plate and casing having registerable recesses in the closed condition of the valve, and a locking pin applicable to said recesses, said pin having screw threads engageable by a key for moving it longitudinally, and said stem and plate having means engageable by a key for rotating same.

5. A device of the class described, comprising a casing having a chamber, a plate slidable and rotatable in the chamber, a valve stem screw threaded to the casing and applicable from the end opposite to the chamber, said stem being secured to the plate, a valve head on said stem at the end opposite to the chamber, a fitting having an inlet and an outlet to which the last-mentioned end of the casing is fastened, said valve head controlling the inlet and outlet, said plate and casing having registerable recesses in the closed condition of the valve, and a locking pin applicable to said recesses, said pin having screw threads engageable by a key for moving it longitudinally, and said stem and plate having means engageable by a key for rotating same, and a cover for said casing having a slot therethrough enabling a key to engage said screw threads and said means.

ROBERT L. LONG.